United States Patent [19]

Clark et al.

[11] Patent Number: 4,829,296

[45] Date of Patent: May 9, 1989

[54] ELECTRONIC LOCK SYSTEM

[75] Inventors: Carey S. Clark, 3629 35th Ave. West, Seattle, Wash. 98199; Gordon B. Winch, Seattle, Wash.

[73] Assignee: Carey S. Clark, Seattle, Wash.

[21] Appl. No.: 858,363

[22] Filed: Apr. 30, 1986

[51] Int. Cl.[4] .......... G06F 7/04; H04Q 1/00

[52] U.S. Cl. .......... 340/825.31; 340/825.34; 235/380; 70/77; 232/7

[58] Field of Search .......... 340/825.31, 825.35, 340/825.32, 825.34, 825.54; 235/382, 382.5; 70/77, 63, 69, 337, 344; 232/12, 44, 4 R, 7

[56] References Cited

U.S. PATENT DOCUMENTS

| | | | |
|---|---|---|---|
| 3,336,770 | 8/1967 | Parsons | 70/141 |
| 3,539,991 | 11/1970 | Irazoqui | 340/171 |
| 3,761,892 | 9/1973 | Bosnyak et al. | 340/149 |
| 3,848,229 | 11/1974 | Perron et al. | 340/149 |
| 3,859,634 | 1/1975 | Perron et al. | 340/149 |
| 3,938,733 | 2/1976 | Weber et al. | 232/16 |
| 4,031,434 | 6/1977 | Perron et al. | 361/172 |
| 4,157,534 | 6/1979 | Schachter | 340/147 |
| 4,209,782 | 6/1980 | Donath et al. | 340/147 |
| 4,250,533 | 2/1981 | Nelson | 361/172 |
| 4,286,305 | 8/1981 | Pilat et al. | 361/172 |
| 4,412,216 | 10/1983 | Mole et al. | 340/825.31 |
| 4,471,905 | 9/1984 | Sloma et al. | 232/12 |
| 4,486,751 | 12/1984 | Mole et al. | 340/825.31 |
| 4,677,284 | 6/1987 | Genest | 340/825.31 |

*Primary Examiner*—Robert L. Griffin
*Assistant Examiner*—Ralph E. Smith
*Attorney, Agent, or Firm*—Christensen, O'Connor, Johnson & Kindness

[57] ABSTRACT

An electronic lock system adapted for use with receivers, such as parking meters, that include storage means and an electronically operable actuator for providing access to material such as coins contained within the storage means in response to an electronic actuation signal. The electronic lock system comprises an access device and an electronic lock associated with each receiver. The access device includes means for storing a plurality of access codes such that each access code is associated with a unique identification code. Each electronic lock comprises means for storing a particular identification code and a passcode, and identification code means for providing the particular identification code. The access device also includes access code means for receiving the particular identification code and for providing the associated particular access code. The electronic lock further includes code comparison means for receiving the particular access code and comparing the particular access code to the passcode and for providing the actuation signal if the two correspond.

5 Claims, 5 Drawing Sheets

| | BIT 7 | BIT 6 | BIT 5 | BIT 4 | BIT 3 | BIT 2 | BIT 1 | BIT 0 |
|---|---|---|---|---|---|---|---|---|
| WORD A | 0 | 0 | 1 | 1 | 0 | 0 | 0 | 1 |
| WORD B | 1 | 0 | 1 | 1 | 1 | 0 | 0 | 1 |
| TERNARY CODE | LOW | OPEN | HIGH | HIGH | LOW | OPEN | OPEN | HIGH |
| TERNARY DIGIT | 0 | 1 | 2 | 2 | 0 | 1 | 1 | 2 |

ELECTRONIC LOCK SYSTEM

FIELD OF THE INVENTION

The present invention relates to electronic locks and, in particular, to an electronic lock system for use with a receiver that includes means for receiving and storing money or other materials. Examples of such receivers include parking meters, vending machines, pay telephones, laudromat machines, airline or bus station lockers, and mailboxes.

BACKGROUND OF THE INVENTION

For an average size city, it has been esimated that up to one million dollars per year of revenue may be lost due to theft from parking meters. Although some thefts are isolated incidents, most of the revenue loss is incurred as a result of systematic theft. Systematic parking meter theft may occur when a person steals a parking meter itself, such as by removing the head of the meter. The parking meter head can then be used to make a master key that is capable of opening other parking meters. Prior attempts to design locks that cannot be reverse engineered have generally been unsuccessful. As a result, there is a long-felt need to a lock system for parking meters and other receiving devices that render such devices immune to systematic theft.

SUMMARY OF THE INVENTION

The basic problem with existing designs for parking meters is that the large number of meters in a given city makes it impractical to have a separate key for each lock. Locks must therefore be designed such that a master key can open many locks. As a result, the parking meters are susceptible to systematic theft that results when a person makes or obtains a copy of a master key.

Stated in its simplest form, the present invention provides an electronic locking system in which a separate "key" is in fact provided for each lock. In a preferred arrangement, each individual lock, e.g., each individual parking meter, is assigned a unique identification code and a unique passcode that is numerically unrelated to the identification code. The identification code in effect identifies a particular lock, and the passcode is analogous to a key that is now unique for each lock. A lock may only be opened upon receipt of its unique passcode.

In one preferred embodiment, the electronic lock system of the present invention is adapted for use with a receiver that includes storage means and an electronically operable actuator. The storage means receives and stores a material such as money. The actuator includes means for permitting access to the material stored by the storage means in response to an electronic actuation signal. The electronic lock system comprises an access device and an electronic lock associated with each receiver. The access device includes means for storing a plurality of access codes such that each access code is associated with a unique identification code. Each electronic lock comprises means for storing a particular identification code and a passcode, and identification code means for providing the particular identification code. The access device further includes access code means for receiving the particular identification code and for providing the associated access code. Finally, the electronic lock comprises code comparison means for receiving the particular access code and comparing the particular access code to the passcode and for providing the actuation signal if the two correspond. In a preferred application for parking meters, the electronic lock would be embodied in the parking meter, and the access device would be a portable, battery operated device that was carried by a person authorized to collect money from the parking meters. In such an arrangement, the access device would preferably provide electrical power for operating the electronic lock.

DETAILED DESCRIPTION OF THE INVENTION

Figure 1:
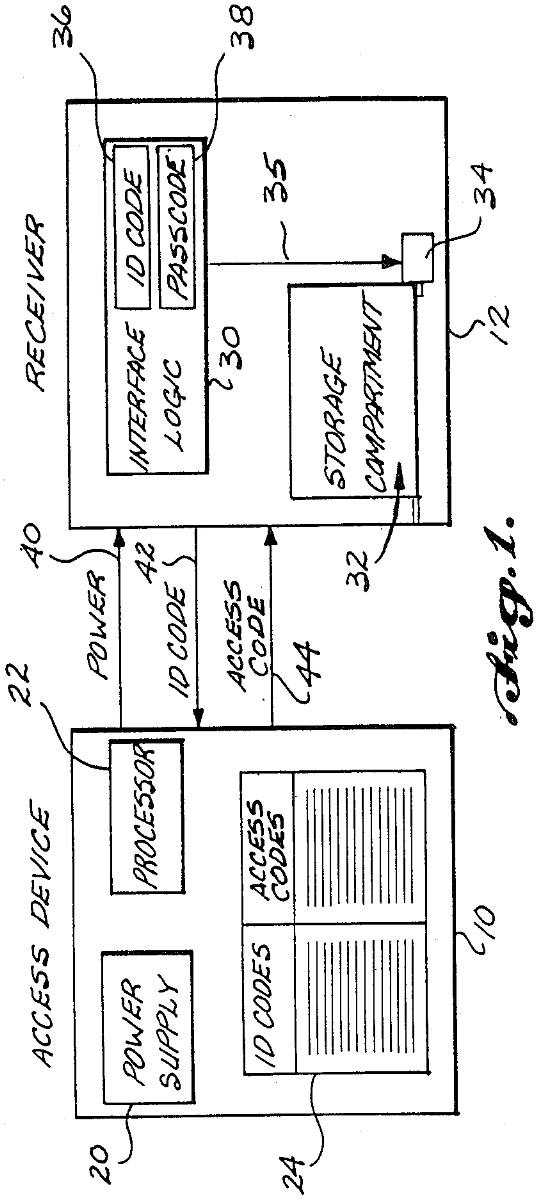
FIG. 1 is a conceptual block diagram of one embodiment of the electronic lock system of the present invention.

FIG. 1 presents a conceptual block diagram of one embodiment of the electronic lock system of the present invention. The lock system comprises access device 10 and a plurality of receivers 12, only one receiver being shown in FIG. 1. In a lock system for parking meters, each receiver would comprise one parking meter, and access device 10 would comprise a portable device that would be carried by a person authorized to collect money from the parking meters.

Access device 10 includes power supply 20, processor 22, and digital memory device 24 in which a table is stored. Conceptually, the table consists of a series of identification (ID) codes, and a corresponding series of access codes. In practice, as described below, it may be simpler to store only access codes in memory device 24, such that the address at which a given access code is stored indicates the corresponding ID code. Receiver 12 includes interface logic 30, storage compartment 32, and electormechanical actuator 34. When actuator 34 is actuated by a suitable signal from interface logic 30 on line 35, the actuator provides access to storage compartment 32. In a parking meter system, storage compartment 32 comprises the receiver for storing coins inserted into the parking meter. Interface logic 30 includes memory device 36 for storing an ID code, and memory device 38 for storing a passcode. In accordance with a basic feature of the present invention, each receiver 12 is assigned a unique ID code and a unique passcode that are stored in memory devices 36 and 38, respectively. The ID code and passcode for each receiver are numerically unrelated to one another, such that knowledge of the ID code does not provide any information concerning the corresponding passcode.

When an individual with access device 10 wishes to retrieve the money or other materials stored in storage compartment 32, the operator interconnects the access device with the receiver by a suitable cable that includes lines 40, 42 and 44. Electrical power is provided from the access device to the receiver via line 40. In response to the availability of electric power, receiver 12 transmits the ID code stored in memory device 36 to the access device via line 42. Access device processor 22 receives the ID code and then searches the table stored in memory device 24 for a matching ID code. If a match is found, then the processor retrieves the access code corresponding to the matching ID code. This access code is then transmitted to receiver 12 via line 44. Interface logic 30 compares the access code received via line 44 with the passcode stored in memory device 38. If the access code and passcode match, then the actuation signal on line 35 is provided, permitting the operator access to storage compartment 32 and the money or other materials stored therein.

It is not necessary for the access device to provide the power for operating the electronic lock system. For example, in an application wherein the receivers are vending machines, it would be more convenient to have the receivers provide power. In some applications, both the access device and receiver may include power sources. Interconnection between the access device and the receiver could be further reduced by providing a single line for transmitting both the ID code and the access code. However, in general, this arrangement would require additional circuitry in both the access device and receiver, and the two-line embodiment of FIG. 1 will therefore be preferable in many cases. It will also be appreciated that means other than electrical means, such as for example optical means or magnetic means, could be used to transmit the ID code and the access code between the access device and receiver, particularly in the case where each unit included its own electrical power source.

The advantage of the system shown in FIG. 1 will be appreciated by considering that even if an unauthorized individual were to gain access to a receiver and was able to retrieve its ID code and passcode, such information would nevertheless be of no value in gaining access to other receivers, since each receiver has a unique identification code and passcode. Systematic theft from receivers 12 is therefore no longer possible.

Figure 2:
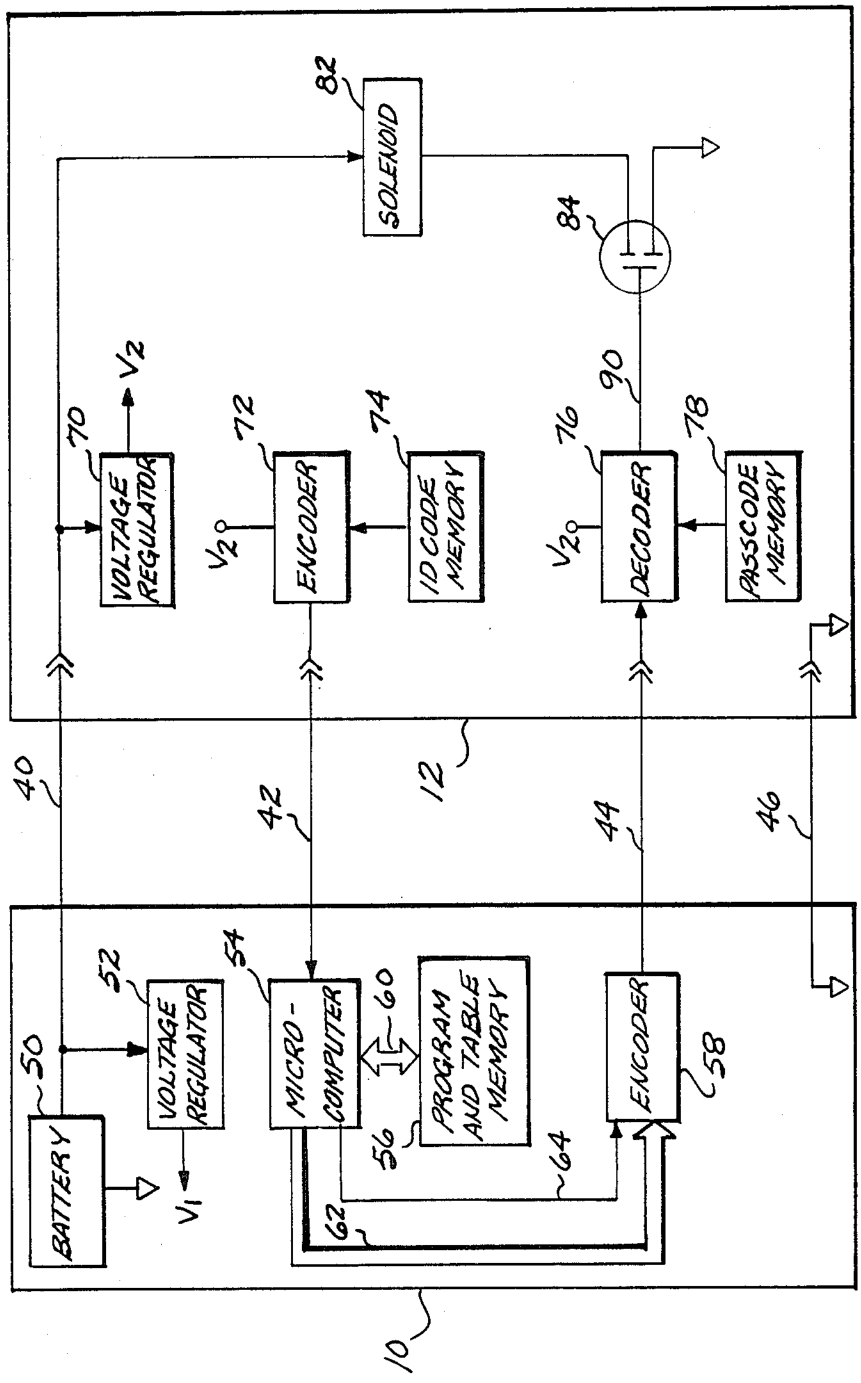
FIG. 2 is a block diagram of the electronic lock system of the present invention.

FIG. 2 presents a block diagram of the electronic lock system of the present system. As with the conceptual diagram of FIG. 1, the lock system comprises access device 10 and receiver 12 that may be interconnected by lines 40, 42 and 44. An additional line 46 is shown in FIG. 2 for establishing a common ground between the access device and receiver. Access device 10 comprises battery 50, voltage regulator 52, microcomputer 54, memory 56 coupled to microcomputer 54 by bus 60, and encoder 58 coupled to microcomputer 54 by bus 62 and line 64. Memory 56 includes both the program for operating microcomputer 54, and the table linking ID codes and access codes described above in connection with FIG. 1. The program is preferably stored in ROM, and the table is preferably stored in RAM or in electronically erasable PROM (EEPROM). Battery 50 produces a comparatively high voltage level on line 40 that is transmitted to the receiver and that is also input to voltage regulator 52. The voltage level on line 40 is selected to be high enough to drive the receiver's solenoid, as described below. Voltage regulator 52 produces a regulated voltage ($V_1$) that is suitable for operating the other components of the access device.

Microcomputer 54 is described in detail below. In general, the microcomputer receives an ID code from the receiver on line 42, uses the ID code to retrieve the corresponding access code from memory 56 via bus 60, and then transmits the passcode to encoder 58 via bus 62 and provides an enable ignal on line 64. The encoder receives the access code and enable signal, and transmits the access code to the receiver via line 44. Any suitable format may be used for transmitting the access code, as well as the ID code described below, between the access device and receiver. Examples of such formats include binary, ternary, frequency keying, pulse code modulation, etc. For the purpose of providing one full description of a preferred embodiment, it will be assumed that encoder 58 comprises a type MC145026 ternary encoder available from Motorola. Such an encoder can serially transmit nine "bits" of ternary data (0, 1 or open), allowing 19,683 possible codes. For convenience, the term "ternary digit" will be used herein to designate a digit in a base three numbering system, i.e., a digit that can take on the values 0, 1 or 2. In the described implementation, these ternary digits correspond to a low-voltage, an open-line, and a high voltage, respectively. For serial transmission between the access device and receiver, each ternary digit is encoded by two data pulses, a 0 or low-voltage level being encoded as two consecutive short pulses, a 1 or open by a long pulse followed by a short pulse, and a 2 or high-voltage level by two consecutive long pulses. Encoder 58 will continuously transmit the access code presented on bus 62 for as long as microcomputer 54 provides the enable signal on line 64.

Receiver 12 comprises voltage regulator 70, encoder 72, ID code memory 74, decoder 76, passcode memory 78, solenoid 82, and FET switch 84. Voltage regulator 70 receives the comparatively high voltage on line 40, and provides a suitable positive voltage supply ($V_2$) to the other receiver components. In general, voltage level $V_2$ need not be identical to voltage level $V_1$ of access device 10. In response to the provision of power, encoder 72 transmits the ID code stored in memory 74 to the access device via line 42. Like encoder 58, encoder 72 can use any known technique for encoding the ID code for transmission to the access device. For simplicity, it will be assumed that encoder 74 is identical to encoder 58, and transmits the ID code as a nine-bit ternary code on line 42. In such an embodiment, ID code memory 74 could simply comprise a set of nine ternary switches, or any other suitable memory device. The transmission of the ID code will commence as soon as power ($V_2$) is provided to the serial encoder.

Decoder 76 may comprise a ternary decoder, type M145028, complementary to encoder 58. Such a decoder receives the nine-bit ternary access code on line 44, compares it with the data stored in passcode memory 78, and provides an enable signal on line 90 if the two codes match. Password memory 78 may comprise a set of nine ternary switches. The enable signal on line 90 is input to FET switch 84. The enable signal "closes" the switch, completing the circuit path from line 40, through solenoid 82 to ground, thereby actuating the solenoid to open storage compartment 32 (FIG. 1).

The electronic lock systm of the present invention may include any one of a number of security techniques designed to foil attempts to electronically "pick" the locks. However, one of the major advantages, if not the principal advantage, of the present invention is that such techniques need not be particularly elaborate or foolproof. The reason is that the complete picking, disassembly, and reverse engineering of a lock does not provide the information required to pick other locks. This feature flows directly from the use of multiple ID codes, each of which has a unique passcode associated with it. Thus, for example in a parking meter application, the only benefit gained from picking one lock is the comparatively small amount of change contained in a single parking meter, thereby insuring that parking meter theft will not be cost effective.

Figures 3, 4:
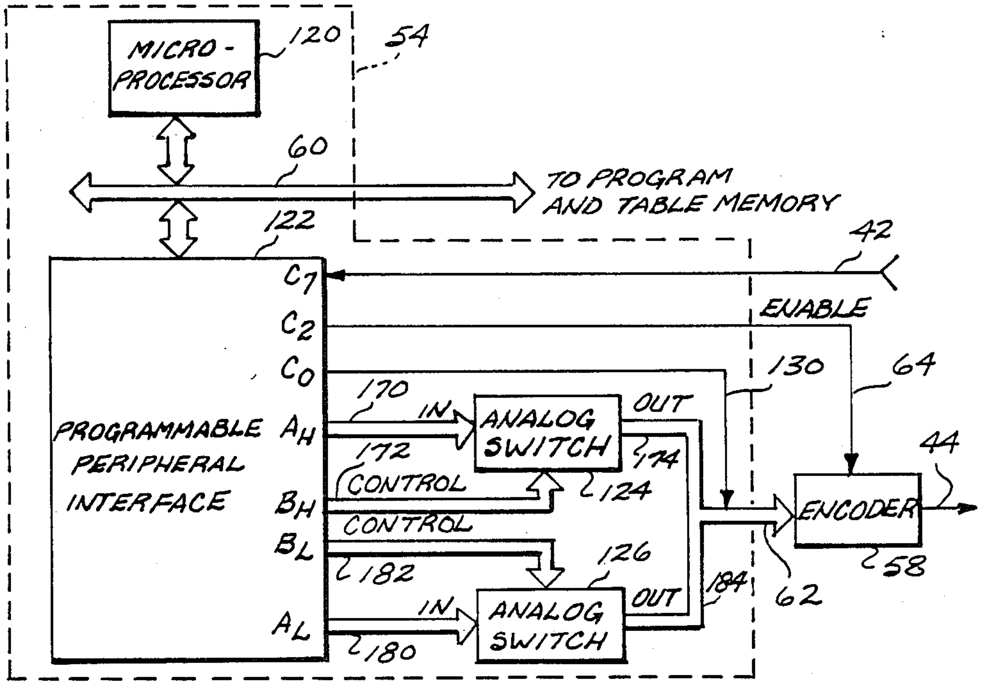
FIG. 3 is a block diagram of the microcomputer.
FIG. 4 is a diagram illustrating the encoding of ternary digits by binary words.

FIGS. 3–5 illustrate further details concerning microcomputer 54. Referring initially to FIG. 3, microcomputer 54 comprises microprocessor 120, programmable peripheral interface 122, and quad analog switches 124 and 126. Microprocessor 120 and interface 122 are interconnected by system bus 60 that also couples the microcomputer to program and table memory 56 (FIG. 2). A suitable device for microprocessor 120 is the 6502A microprocessor available from Rockwell. A suitable device for interface 122 is the 8255A programmable peripheral interface available from Intel. Such an interface comprises eight-bit ports A, B and C. Each port can be configured by microprocessor 120 as an input port or an output port. In the embodiments shown in FIG. 3, port A is shown divided into two four-bit ports, AH (bits 4–7) and AL (bits 0–3). Port B is similarly divided into four-bit ports BH and BL, and port C is utilized as three one-bit ports, C0, C2 and C7. The high-order bits of port C (including C7) are defined as an input port, and the remaining ports are defined as output ports. Port definition is accomplished by microprocessor 120 via bus 60.

In operation, interface 122 can be conceived of as a series of addressable latches. For example, if microprocessor 120 is to write a given eight-bit data word into port B, the microprocessor transmits the data word, an address signal, and a chip select signal to the interface via bus 60. The chip select signal selects interface 122 as the device to receive the data word, the address signal selects port B of interface, and the data itself is transmitted via the data portion of bus 60. Input operations are handled in a similar manner. Port C7 is directly connected to line 42 on which the ID code is received from encoder 72 of receiver 12. Appropriate level shifters may be interposed between line 42 and interface 122, if required for a given application. Transient voltage suppressors may be used in connection with the lines connecting the access device and receiver, to protect voltage-sensitive components.

The microprocessor is adapted to transmit a binary signal representing nine ternary digits to encoder 58 via bus 62, and to transmit an enable signal to the encoder via line 64. The enable signal is derived directly from port C2, which is defined as an output port as described above. The signal representing nine ternary digits on bus 62 is derived from ports AH, BH, BL, AL and C0. One digit is derived from port C0 via line 130, four digits are derived from ports AH and BH via analog switch 124, and the remaining four digits are derived from ports BL and AL via analog switch 126. Details of the derivation of the signal on bus 62 are described in further detail below.

Figure 5A:
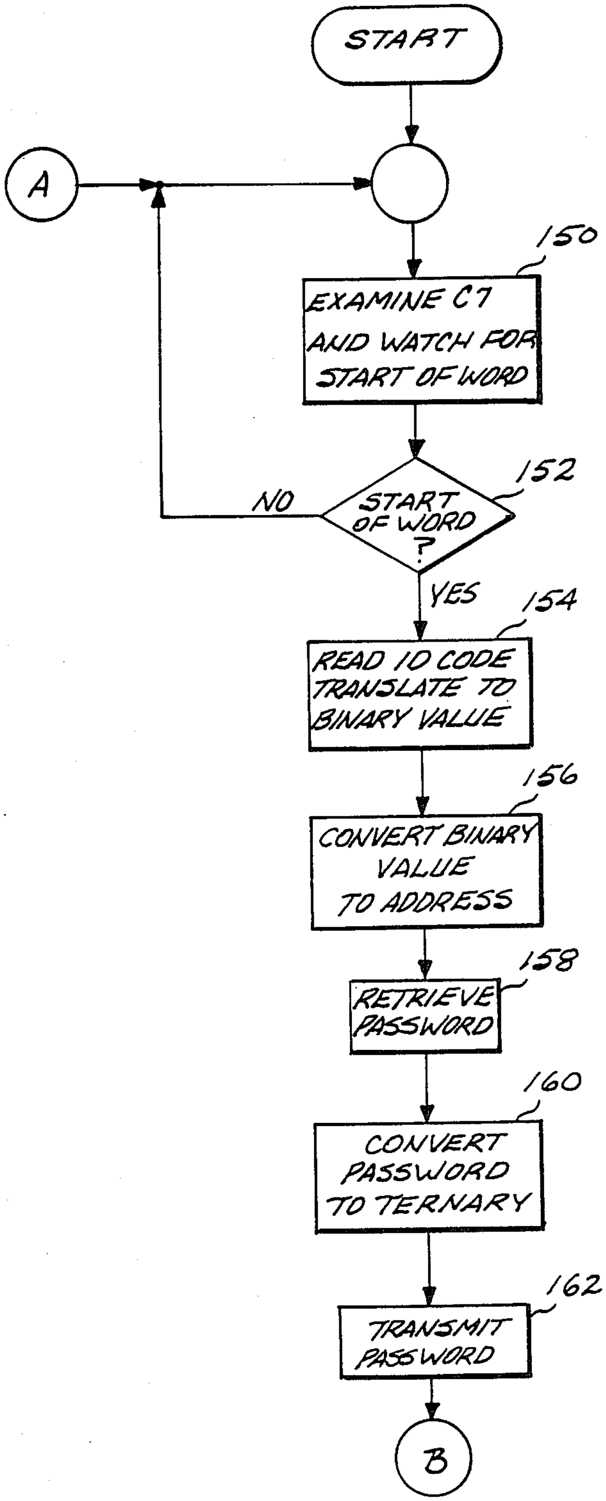
FIGS. 5A and 5B are a flow chart for controlling the operations of the microprocessor.
Figure 5B:
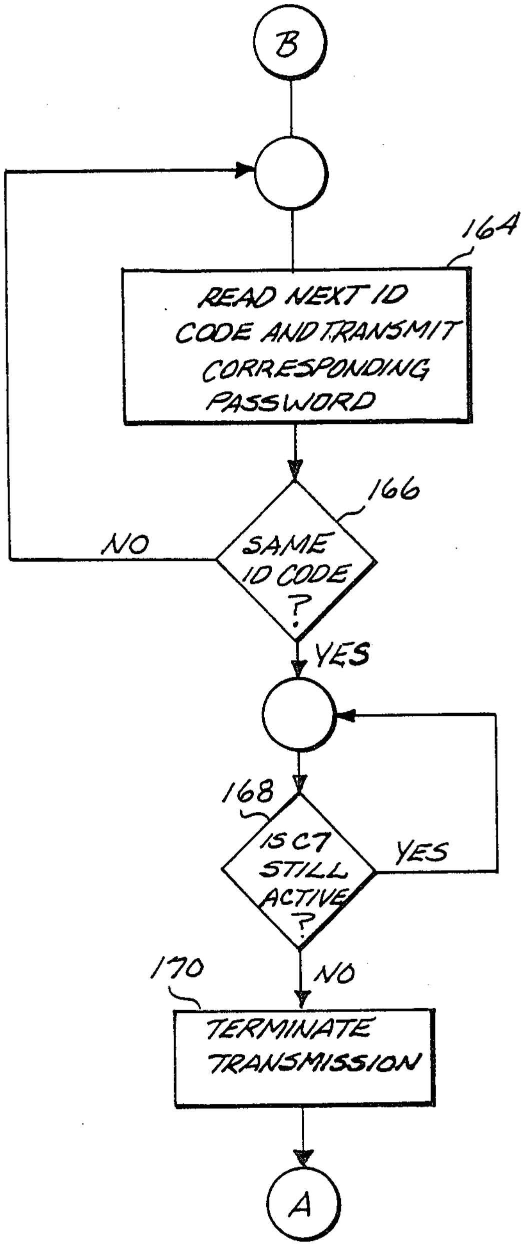

The operation of microprocessor 20 is diagrammed in FIGS. 5A and 5B. Upon commencement of operations, the microprocessor in block 150 examines port C7 and watches for the start of a word from receiver 12 via line 42. For the MC145026 encoder, the start of word is a characteristic sequence of timing pulses that can readily be detected by the microprocessor by successively sampling port C7. If a start of word is not received, the microprocessor continues executing block 150. However, when a start of word is detected, test block 152 transfers control to block 154, and the microprocessor reads the ternary ID code received via port C7 and converts such ID code to a binary value. As described above, the coding convention is assumed to be: low equals 0; open euals 1; and high equals 2. The ternary code may be converted to binary simply by multiplying each ternary digit (0, 1 or 2) by the appropriate power of 3, or by an equivalent successive addition scheme well known to those skilled in the art. Once the binary ID code has been computed, the microprocessor, in block 156, converts the binary ID code to a table address by multiplying the binary value by 2 and adding a fixed offset. The fixed offset represents the beginning location of the table in memory, while the value 2 is used because each passcode in the table occupies two bytes. Once the address has been computed, the passcode is retrieved at block 158, converted to ternary in block 160, and transmitted to the receiver via line 44 in block 162. Details of conversion of the passcode to ternary are described below.

After executing block 162, the microprocessor transfers control to block 164 (FIG. 5B), and the above-described sequence is repeated, i.e., a subsequent ID code is read, converted to binary and then to a table address, and the corresponding passcode is retrieved from the table. The microprocessor then checks, in block 166, to determine whether the second ID code is the same as the first received ID code. If the ID codes differ, then block 164 is reexecuted until such time as two successive identical ID codes have been received. At this point, control passes to block 168. The microprocessor in block 168 checks whether port C7 remains active, i.e., whether ternary data continues to be received via port C7. When such data ceases, transmission is terminated at block 170 by removing the enable signal on line 64, and the program returns to block 150 (FIG. 5A) to begin waiting for a subsequent ID code from the receiver.

The method by which microprocessor 120 converts a two-byte binary passcode to data that represents nine ternary digits may be illustrated with reference to FIGS. 3 and 4. The binary passcode (15 bits actually used) is converted to a code for transmission by a conventional technique of successive subtraction. The MC145028 decoder used for the illustrated embodiment permits only two states (low or high) for the ninth, high-order digit, i.e., digit 9 is in fact binary while digits 1–8 are ternary. The illustrated embodiment takes advantage of this fact, and sets the high-order digit simply by comparing the passcode to 6561 ($3^8$). If the passcode exceeds 6561, then port C0 is set high and 6561 is subtracted from the passcode, to produce a passcode remainder. If the passcode does not initially exceed 6561, then port C0 is set low. The process then proceeds to determine the value (0, 1 or 2) for each of the remaining eight ternary digits, by continuing the subtraction technique. For example, if the passcode remainder is less than 2187 ($3^7$), then the eighth ternary digit is set to 0. If the passcode remainder exceeds 2187, then the value of 2187 is subtracted from the passcode remainder one or two times, until the subsequent password remainder is less than 2187 . If 2187 was subtracted once, then the eighth ternary digit is 1, while if 2187 was subtracted twice, then the eighth ternary digit is equal to 2. This process continues until all eight ternary digits have been determined. These digits are encoded into two eight-bit data words A and B as indicated in FIG. 4. FIG. 4 illustrates the coding of the eight ternary digits for the specific example in which the ternary digits are 01220112. As illustrated by the example set forth in that figure, a ternary digit of 0 is encoded by a 0 in word A and a 1 at the corresponding bit position of word B. A ternary digit of 1 is encoded by a 0 in word A and a 0 at the corresponding bit of word B. A ternary digit of 2 is encoded by a 1 in word A, and a 1 in the corresponding bit of word B. As will become clear below, a ternary digit of 1 could equally well be encoded by a 0 in word B and a 1 in the corresponding bit of word A, i.e., the word A bit is irrelevant when the word B bit is 0.

Once words A and B have been calculated from the binary passcode value, the words are then transmitted to ports A and B, respectively. Bits 4–7 of word A thereby appear on bus 170 and are input to analog switch 124, whereas bits 4–7 of word B appear on bus 172, and form the control inputs to analog switch 124. Analog switch 124 may be conceived of as four independent analog switches. Each independent analog switch transmits its input signal (one of the lines on bus 170) to its output terminal (the corresponding line on bus 174) whenever a high signal is received at its control terminal (the corresponding line of bus 172). On the other hand, when the control input is low, the output terminal is open. Thus with reference to FIG. 4, when a given but such as bit 7 of port B (i.e., word B) is high, then the corresponding bit of port A is passed through to the output on bus 174, i.e., a 0 on the corresponding port A bit translates to a low signal on bus 174, while a high for the corresponding A bit translates into a high signal on bus 174. However, when a given bit (e.g., bit 6) of port B is low, then the output of the analog switch is open, regardless of the state of the corresponding port A bit. The four-bit signals produced by analog switches 124 and 126 on buses 174 and 184, respectively, are merged with line 130 to provide a nine-digit ternary input signal to encoder 58 on bus 62.

While the preferred embodiments of the invention have been illustrated and described, it is to be understood that variations will be apparent to those skilled in the art. The invention is therefore not to be limited by the foregoing embodiments, but the true scope and spirit of the invention are instead to be determined by reference to the following claims.

The embodiments of the invention in which an exclusive property or privilege is claimed are defined as follows:

1. An electronic lock system for use with a plurality of receivers, each receiver including storage means for receiving and storing a material and an electronically operable actuator that includes means for permitting access to material stored by the storage means in response to an electronic actuation signal, the electronic lock system comprising:

an access device including access storage means for storing a plurality of access codes such that each access code is associated with a unique identification code, and access code means; and an electronic lock associated with each receiver, each electronic lock comprising receiver storage means for storing a particular identification code and a passcode, identification code means for providing the particular identification code, and code comparison means;

the access code means including means for receiving the particular identification code from the electronic lock and for providing the associated particular access code;

the code comparison means comprising means for receiving the particular access code from the access code means, and means for comparing the particular access code to the passcode and for providing the actuation signal upon correspondence therebetween;

the access device comprising power supply means for providing electrical power to the access device, and wherein the electronic lock comprises means for deriving electrical power for the electronic lock from the power supply means, and, the electronic lock providing the identification code to the access code means in response to the providing of electric power to the electronic lock by the access device, the identification code being independent of any signals other than the receipt of said electric power.

2. The lock system of claim 1, wherein the access device comprises digital memory means for storing the access codes and processor means for receiving the particular identification code and for producing the associated particular access code from the memory means.

3. The lock system of claim 1, wherein the identification code means comprises encoding means for receiving a parallel digital signal from the receiver storage means representing the particular identification code and for producing a serial digital signal corresponding thereto.

4. The lock system of claim 1, wherein the access code means comprises microcomputer means for producing the particular access code in parallel form and encoding means for receiving in parallel form the particular access code and for producing a serial digital signal corresponding thereto.

5. The lock system of claim 4, wherein the code comparison means comprises decoding means for receiving said serial digital signal and for comparing the serial digital signal to the passcode, and means for providing the actuation signal when the serial digital signal corresponds to the passcode.

* * * * *